(12) United States Patent
Vanstone et al.

(10) Patent No.: US 8,189,772 B2
(45) Date of Patent: *May 29, 2012

(54) METHOD AND APPARATUS FOR PERFORMING ELLIPTIC CURVE ARITHMETIC

(75) Inventors: Scott Alexander Vanstone, Campbellville (CA); Daniel Richard L. Brown, Mississauga (CA)

(73) Assignee: Certicom Corp., Mississauga, Ontario (CA)

( * ) Notice: Subject to any disclaimer, the term of this patent is extended or adjusted under 35 U.S.C. 154(b) by 23 days.

This patent is subject to a terminal disclaimer.

(21) Appl. No.: 12/836,101

(22) Filed: Jul. 14, 2010

(65) Prior Publication Data
US 2010/0278333 A1    Nov. 4, 2010

Related U.S. Application Data

(63) Continuation of application No. 12/197,667, filed on Aug. 25, 2008, now Pat. No. 7,778,412, which is a continuation of application No. 10/428,853, filed on May 5, 2003, now Pat. No. 7,418,099.

(60) Provisional application No. 60/377,222, filed on May 3, 2002.

(51) Int. Cl.
*H04L 9/00* (2006.01)
*H04L 9/14* (2006.01)

(52) U.S. Cl. ............................ 380/28; 380/263; 380/30

(58) Field of Classification Search .................. None
See application file for complete search history.

(56) References Cited

U.S. PATENT DOCUMENTS

| | | | | |
|---|---|---|---|---|
| 5,159,632 | A * | 10/1992 | Crandall | 380/28 |
| 6,170,058 | B1 * | 1/2001 | Kausik | 713/193 |
| 6,195,433 | B1 * | 2/2001 | Vanstone et al. | 380/285 |
| 6,252,959 | B1 * | 6/2001 | Paar et al. | 380/28 |
| 6,289,454 | B1 * | 9/2001 | Eslinger et al. | 713/189 |
| 6,490,352 | B1 * | 12/2002 | Schroeppel | 380/30 |
| 7,418,099 | B2 | 8/2008 | Vanstone et al. | |
| 2009/0074180 | A1 | 3/2009 | Vanstone et al. | |

OTHER PUBLICATIONS

Biehl, I. et al.; "Differential Fault Attacks on Elliptic Curve Cryptosystems"; Advances in Cryptology—Crypto 2000 Proceedings; 2000; pp. 131-146; Lecture Notes in Computer Science; vol. 1880; Springer-Verlag. Available from http://lecturer.ukdw.ac.id/vmueller/publications.php.

* cited by examiner

*Primary Examiner* — William Powers
(74) *Attorney, Agent, or Firm* — Dimock Stratton LLP; Etienne de Villiers

(57) ABSTRACT

A method of performing a cryptographic operation on a point in an elliptic curve cryptosystem using an elliptic curve. The method comprises the steps of obtaining information that uniquely identifies the elliptic curve and performing computations on the point to obtain the result of the cryptographic operation. The computations use the information. The computations produce an incorrect result if the point is not on the elliptic curve.

24 Claims, 3 Drawing Sheets

METHOD AND APPARATUS FOR PERFORMING ELLIPTIC CURVE ARITHMETIC

CROSS-REFERENCE TO RELATED APPLICATIONS

The present application is a continuation of U.S. patent application Ser. No. 12/197,667 filed on Aug. 25, 2008, which is a continuation of U.S. patent application Ser. No. 10/428,853 filed on May 5, 2003 which claims priority from U.S. Provisional Application No. 60/377,222 filed on May 3, 2002, the contents of which are hereby incorporated by reference.

FIELD OF THE INVENTION

The present invention relates to elliptic curve arithmetic.

DESCRIPTION OF THE PRIOR ART

Cryptography is an important tool for information security. Authenticated key establishment is a necessary ingredient for secure use of cryptography. Public key cryptography is a powerful tool for authenticated key establishment. Two families of public key cryptography techniques are the Rivest-Shamir-Adleman (RSA) techniques, the Diffie-Hellman (DH) techniques and the related ElGamal discrete logarithm (DL) techniques. Elliptic curve cryptography (ECC) is a member of the latter family using elliptic curve arithmetic as opposed to the modular integer arithmetic. The advantages of ECC are many.

An elliptic-curve point is a pair (x,y) of values x and y that belong to a finite field. An elliptic curve E is a set of such points defined by an equation plus one further point, called the point at infinity and denoted by 0. When the finite field is a prime field $F_p$ then the equation is of the form $y^2=x^3+ax+b$ for some elements a and b in the field. When the finite field is a binary field $F_{2^m}$ then the equation is of the form $y^2+xy=x^3+ax^2+b$. The values a and b are called the coefficients of the equation. The notation $E_{a,b}$ distinguishes the values of the coefficients a and b, if need be. Points can be added using formulae involving the components. A point can be multiplied by an integer k to obtain another point kP=P+P+ . . . +P, where there are k points in the sum. A point G and an integer n are distinguished such that nG=O. The distinguished point G is called the generating point and n is called the order of the point G. An elliptic-curve public-key P is of the form P=vG where v is the associated private key. Numerous standards specify curves and their distinguished points such that their order n is prime.

The ECIES protocol is specified in the standard ANSI X9.63-2001 [X9.63, Section 5.8] and is summarised here for completeness. In this protocol a sender wishes to encrypt a message to a recipient. The recipient's long term keypair is (v,Q), where Q=vG. The sender generates an ephemeral elliptic-curve key-pair (e,P), where P=eG, and generates two symmetric-encryption keys, $K_1$ and $K_2$, from the product eQ via the use of a key-derivation function as described in the standard. The first symmetric key is used to encrypt the message and the second symmetric key is used to generate a keyed hash of the encrypted message. The ephemeral public key P, the encrypted message, and the keyed hash are transmitted to the recipient. The above standard also provides methods of key agreement, key transport, encryption, and authentication.

The recipient validates the purported ephemeral public key P and then recovers the two symmetric-encryption keys from the product vP via the use of the key-derivation function as described in the standard. The second symmetric key is used to verify the keyed hash and the first symmetric key is used to recover the message.

In a prior patent application PCT CA98/100959, the assignees of the present application recognised that an important security safeguard for all forms of public-key cryptography is public-key validation. Public-key validation comprises confirming that what purports to be a public key is, in reality, a public key by ensuring that it satisfies a number of pre-defined criteria. A good security principle is to always validate a purported public key before use. If the purported public key is invalid then performing any operations with it may jeopardize security.

Elliptic-curve public key validation involves the following four steps:
1. Verify that the public key is not O;
2. Verify that the co-ordinates x and y of the public key P=(x,y) are valid elements of the field;
3. Verify that P is on the curve, which can be done by testing the defining equation; and
4. Verify that nP=O.

If public-key validation is not performed for every purported public key received then there is the risk that the public key is not valid and processing it will adversely affect the security of the system. In particular, the third step above, checking that P=(x,y) is on the curve, is important because of possible attacks. Processing a public key P invariably involves multiplication by some secret integer v that acts as the long term private key. The secrecy of v is vital to the security of the system. The quantity vP is computed and then used subsequently as the long term public key. The intractability of recovery from the vP is the basis of public key cryptography. If P has undesirable characteristics then information can leak from the computation about private data, such as private keys. In particular, this is true using a unsafe variant of ECIES with non-validated public keys, as will be explained more fully below.

In a recently proposed protocol, an unsafe variant of ECIES was advocated wherein the step of validating the public key at the recipient is omitted. The lack of validation opens the recipient to the attack described below that can be carried out by anyone who wishes to discover the private key of the recipient.

The attack is based on the observation that, although an elliptic curve $E_{a,b}$ is defined in terms of its coefficients a and b, the usual formulae defining addition and doubling in elliptic curves do not involve the coefficient b. Thus the same elliptic-curve addition and doubling formulae for $E_{a,b}$ will also work for another curve $E_{a,b'}$ with b'≠b. If an attacker chooses a point P that belongs not on the curve $E_{a,b}$ but rather on another curve $E_{a,b'}$ that possesses undesirable characteristics, calculations involving P do not take place in the former curve but rather in the latter curve. If the recipient does not validate P as belonging to $E_{a,b}$ as set forth in the above referenced prior application then calculations involving P will leak information.

In one attack, the sender who wishes to attack the security of v forces a zero-division at the recipient by a judicious choice of the transmitted ephemeral point P. This variant assumes that the recipient's behaviour on zero-division can be detected by the attacker. (For example, if a zero-division causes a fault or exception or some such behaviour that can be detected and distinguished as such.) Information can then leak out.

By way of example, with a prime curve, the attacker sends the point P=(x,0) and the recipient calculates 2P as part of the decryption process of multiplying P with the private key. The use of the usual affine formula causes some sort of detectable behaviour because the usual formula involves dividing by zero. The attacker now knows that the corresponding bit of the private key is zero. More bits can now be extracted by sending points that cause zero-division with specific multiplications kP. (Finding such points involves solving polynomial equations over the underlying finite-field which may be done relatively efficiently.)

In an alternative attack, the attacker discovers the factors of the private key by forcing the recipient to calculate in another elliptic curve of lower order and then combines said factors to recreate the private key.

To perform this attack, the attacker first finds a point P and an elliptic curve E' such that the former generates a low-order subgroup in the latter, say of order r so that rP=O in E'. Next, a judicious guess is made of an integer t such that tP=vP in E', where v is the recipient's private key. Having this, the attacker can create an ECIES message based on E'. If t and v are congruent modulo the order of the low-order subgroup, the validation of the keyed hash
succeeds. The success of the keyed hash informs the attacker that the private key equals t modulo r. The attacker then repeats the process with different points and curves, eventually combining all the modular pieces using the Chinese Remainder Theorem (CRT).

This attack may be applied for example to the NIST-recommended curve P-192 that is defined over a prime field $F_p$, where p is close to $2^{192}$. This curve has prime order, also close to $2^{192}$. To launch the attack, first find 36 points that belong to curves with b coefficients different from P-192 but with the same a coefficient and whose orders are the first 36 prime numbers: 2, 3, 5, ..., 151. (It is possible to find such points by selecting random coefficients b, counting the number of points on the associate curve by the Schoof-Elkies-Atkin algorithm,
checking the order of the curve for divisibility by one of the first 36 primes, and finding points on the curve of each of such prime order by multiplying random points on the curve by the order of the curve divided the prime divisor.) Once the 36 points are collected, they can be used to find a victim's private key modulo 2, 3, ..., 151. Each prime requires half its value in guess attempts by the attack. On average, the attacker requires the victim to confirm about (2+3+ ... +151)/2 guesses, or about 1214 guesses. If the recipient is an automated server, this is completely plausible. For curves of larger order, more guesses are required while for curves of smaller order, fewer guesses are required.

In general, it is not necessary that such a large number of guesses be confirmed by the recipient. Harm can be done even if one guess is confirmed, since information is then leaked about the recipient's private key. Even if the attacker's guess of t for a given modulus r is incorrect, the attacker still learns that the recipient's private key does not equal t modulo r, so that information is leaked. A limited set of confirmed guesses is considerably worse than merely what the theoretical information leakage would suggest because of the following practical means of exploiting partial information leaked about the private key.

Suppose that the private key v is between 1 and n−1. Suppose further that the attacker learns d modulo $r_j$ for k small and relatively-prime numbers $r_1, ..., r_k$ but $m=r_1 r_2 ... r_k < n$. In this case the attacker can use the Chinese remainder theorem (CRT) to compute n completely. The attacker uses CRT to compute that d=x (mod m) where x is between 0 and m−1. The attacker can thus deduce that d=x+ym for some y between 1 and (n−1)/n. Now the attacker can speed up the usual Pollard rho and kangaroo methods to find d as follows. The attacker has the public key Q=vG, a valid point on the curve. The attacker computes (1/m mod n)(Q-xG) which the attacker knows to be equal to yG. Since the attackers know that y belongs a smaller range [1,(n−1)/m] than the general range [1, n−1], the attacker can speed up the Pollard rho algorithm by well-known techniques.

SUMMARY OF THE INVENTION

Validating the public key obviates the attack above. However, the following offers an alternate method should public key validation be undesirable.

The attack above may be prevented without using public key validation by using alternate forms of elliptic-curve point operations that work for the correct curve but produce different results for the attacking curve. Using both coefficients in the calculations ensures this. In particular, to ensure that multiplication in the correct curve produces a different result in the attacking curve, it generally suffices to occasionally substitute the usual formulae for doubling points with the alternate formulae (because multiplication frequently employs doubling). The alternate formulae are less efficient but their use need only be sparingly sprinkled in the calculations. A further aspect of the invention is using prime private keys or private keys without small factors (in the case of prime fields). Yet another aspect is the use of the alternate formulae randomly.

According to one aspect of the present invention, there is provided a method of performing a cryptographic operation on a point in an elliptic curve cryptosystem using an elliptic curve. The method comprises the steps of:
  a) obtaining information that uniquely identifies the elliptic curve; and
  b) performing computations on the point to obtain the result of said cryptographic operation.
The computations use the information. The computations produce an incorrect result if the point is not on the elliptic curve.

According to a further aspect of the present invention, there is provided a cryptographic unit for performing a cryptographic operation on a point in an elliptic curve cryptosystem using an elliptic curve. The unit comprises:
  a) storage for information that uniquely identifies the elliptic curve; and
  b) a cryptographic module operably coupled to the storage to perform computations on the point to obtain the result of the cryptographic operation, the computations using the information.
The computations produce an incorrect result if the point is not on the elliptic curve.

According to yet another aspect of the present invention, there is provided a computer readable storage medium containing processor instructions for performing a cryptographic operation on a point in an elliptic curve cryptosystem using an elliptic curve. The medium includes instructions to:
  a) obtain information that uniquely identifies the elliptic curve; and
  b) perform computations on the point to obtain the result of the cryptographic operation, the computations using the information.
The computations produce an incorrect result if the point is not on the elliptic curve.

DESCRIPTION OF THE PREFERRED EMBODIMENTS

Figure 1:
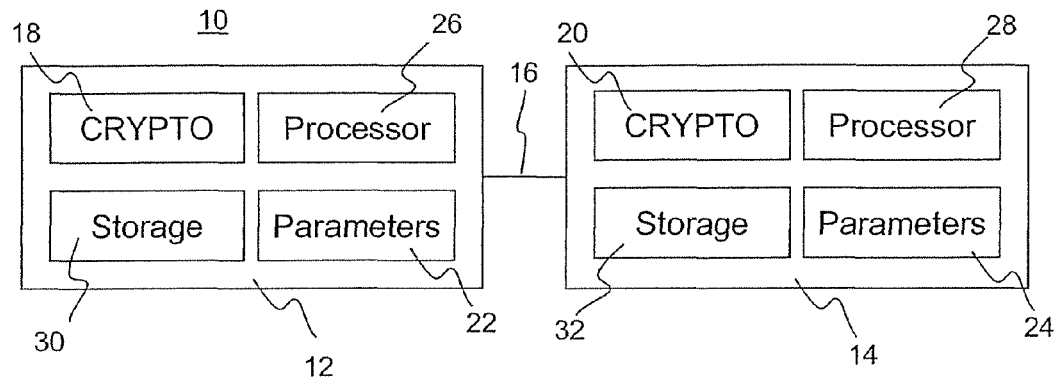
FIG. 1 is a schematic representation of a communication system.

Referring to FIG. 1, a communication system comprises a pair of correspondents 12, 14 who communicate over a communication link 16. Each correspondent has a cryptographic module 18, 20, and elliptic curve parameters 22, 24. Each correspondent has a respective processor 26, 28. The correspondents can be provided with a display and user input devices such as a keyboard, mouse, or other suitable devices. If the display is touch-sensitive then the display itself can be employed as the user input device. A computer readable storage medium 30, 32 is coupled to each of the processors 26, 28 for providing instructions to the processors 26, 28 to instructing or configure the processors, as further explained below. The computer readable medium 30, 32 can include software and/or hardware such as, by way of example only, magnetic disks, magnetic tape, optical readable mediums such as CD ROMS and semi-conductor memory such as PCMCIA Cards, as well as integrated ROM chips or secure smart card memory. In each case, the medium 30, 32 may take the form of a portable item such as a small disk, floppy diskette, cassette, smart card or it may take the form of a relatively large and immobile item such as a hard disk drive, solid state memory card, or RAM. lit should be noted that the above listed example mediums can be used either alone or in combination. Each correspondent implements an elliptic curve cryptographic system, using the parameters 22, 24. The parameters 22, 24 provided include an elliptic curve specified by coefficients, a,b, and a generating point G. The parameters 22, 24 also include an indication of a finite field. The elliptic curve cryptographic system may perform various cryptographic operations and encodings, such as by way of example only, encryption and authentication. Furthermore, the system may be implemented by way of example only as a standalone cryptographic unit, or as a software package for a general purpose processor, or as a special-purpose hardware.

Figure 2:
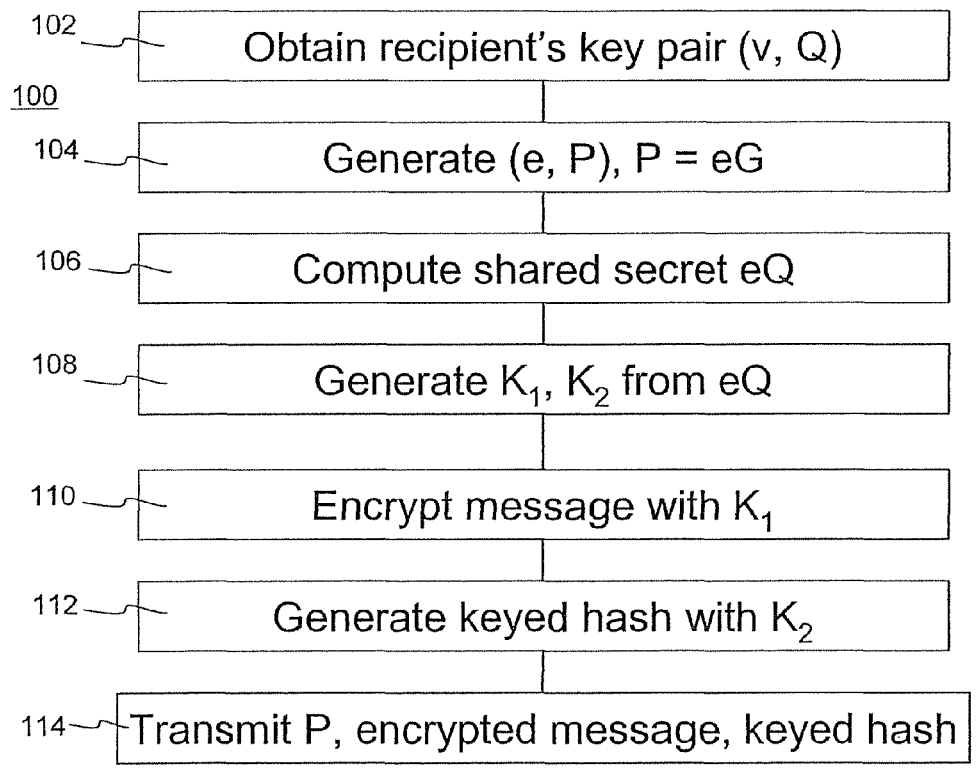
FIGS. 2, 3, and 4 are flow charts of methods performed by the correspondents of FIG. 1.

Referring to FIG. 2, the encryption method performed by the correspondent 12 is shown generally by the numeral 100. In this method, the correspondent 12, the sender, wishes to encrypt the message for the correspondent 14, the recipients, for transmission over the communication link 16. The correspondent 12 first obtains (102) the recipient 14's public key, Q=vG. The sender 12 then generates (104) an ephemeral elliptic curve key pair (e,P) where P=eG. The correspondent 12 then computes (106) the shared secret eQ. It then generates (108) the keys K1, K2 from eQ using the key derivation function. The correspondent 12 then encrypts (110) a message using the key $K_1$. The correspondent 12 then generates (112) a keyed hash using the key $K_2$. The correspondent 12 then transmits (114) the public key P, encrypted message, and keyed hash to the correspondent 14.

Figure 3:
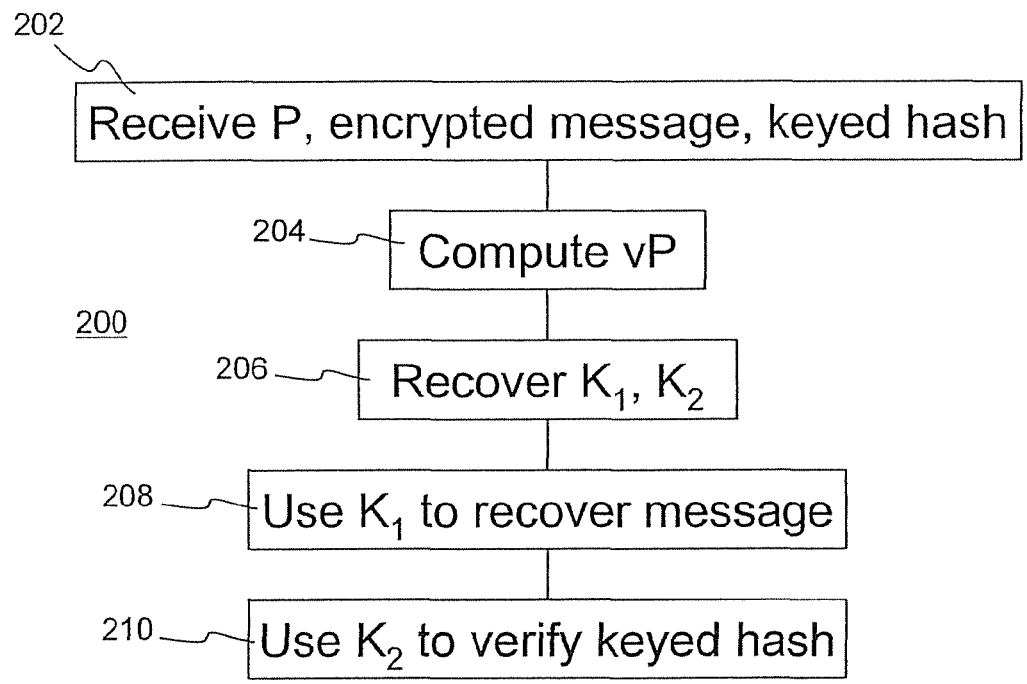

Referring to FIG. 3, the operations performed by the correspondent 14 upon receipt of the information transmitted at step 114 is shown generally at numeral 200. The correspondent 14 first receives (202) the public key P, encrypted message, and keyed hash. The correspondent 14 then computes (204) VP, which should be equal to the shared secret eQ. Correspondent 14 then recovers (206) keys $K_1$ and $K_2$ from vP. Correspondent 14 then uses (208) the key $K_1$ to recover the message. The correspondent 14 uses (210), the key $K_2$ to verify the keyed hash. In performing the computation (204) of vP, correspondent 14 uses information that uniquely identifies the elliptic curve in at least one of the steps of the computation but preferably not all of the steps of the computations. Preferably, this entails using the coefficient b in at least one doubling operation, as described further below but not for all the doubling operations. By using the information that uniquely defines the curve in at least one of the computation, the attacks described above are prevented. However, by not using the information in all of the computations, the efficiency of optimised routines is maintained.

Figure 4:
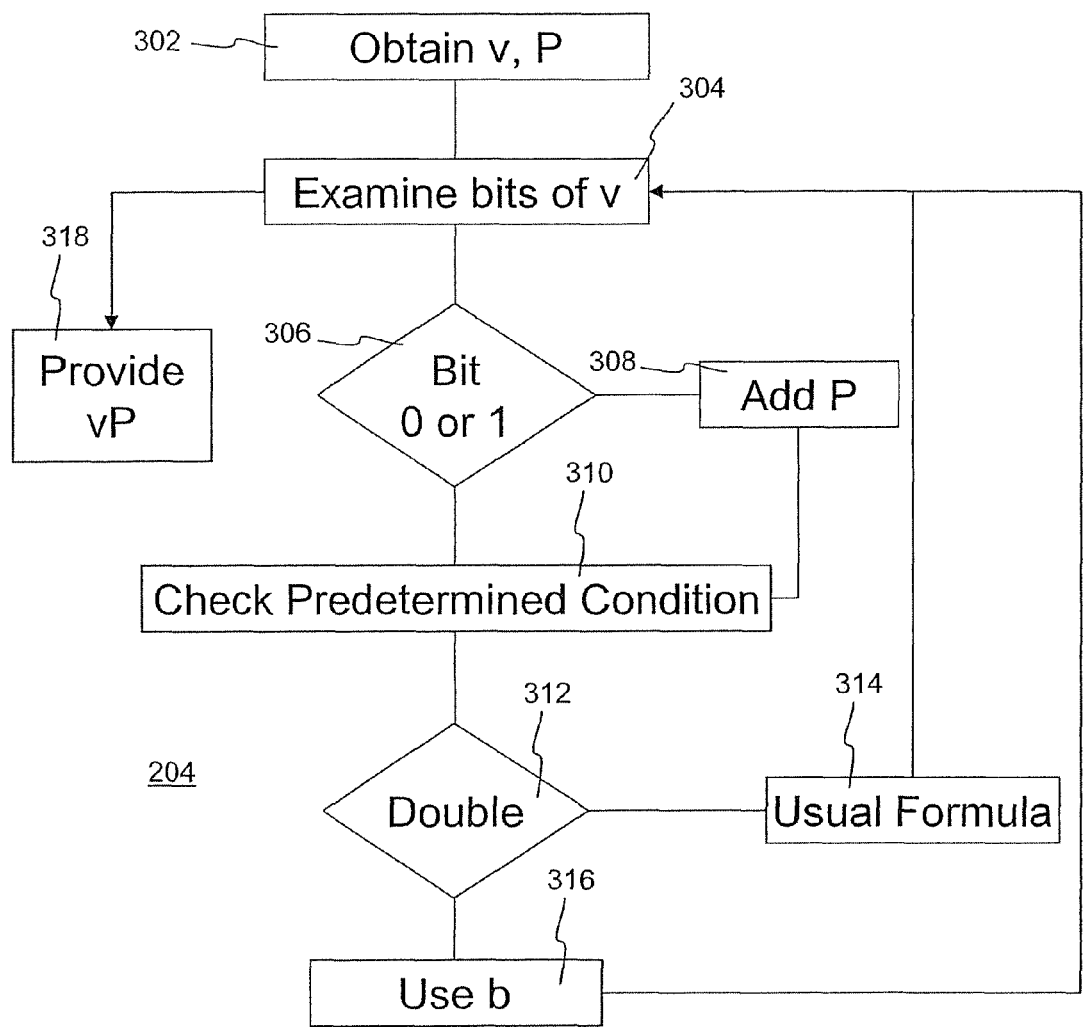

Referring therefore to FIG. 4, the step 204 is shown in more detail. For clarity, the method begins with the step 302 of obtaining v and P. P is stored in an accumulator. The bits of v are then examined at step 304 and tested to see whether they are 0 or 1 at step 306, in accordance with any standard double and add method of performing scalar multiplication. When a bit is one, the point P is added to the accumulator at step 308. It is then necessary to perform a doubling operation. However, two different methods are used for doubling operations in accordance with predetermined criteria. The criteria may be determined by randomly selecting certain doubling operations, or using a regular pattern, such as every $5^{th}$ or $100^{th}$ doubling. When the predetermined condition is not present, the usual formula is used at step 314. When the predetermined condition is present, the formula making use of coefficient b is used at step 316. The method then continues by examining further bits of v at step 304, until all the bits of v have been examined and operated upon. At this point, the accumulator will contain the value of vP which may be provided to other methods performed by the correspondent 14 at step 318.

Prime Curve Implementation: The usual affine curve equation is $y^2=x^3+ax+b$. The usual formula for doubling a point is $$2(x,y)=(x',y')$$

where $$x'=z^2-2x,$$

$$y'=z(x-x')-y,$$

and $$z=(3x^2+a)/(2y)$$

The curve equation gives us that $$a=y^2/x-x^2-b/x$$

hence $$z=f_b(x,y)$$

is a polynomial in b. Using this value of z intermittently in the doubling formula produces the correct result in the correct curve but a different result in an attacking curve with a different coefficient.

The value z may be computed as:

$$z=(2x^2-b/x+y^2/x)/(2y)=x^2/y+y^2/x-b/(2xy)=(2xy(x+y)-b)/(2xy)$$

This formula for z is less efficient than the original formula because it uses two field multiplications rather than one but it has the advantage that it involves the coefficient b. During scalar multiplication, if this alternate formulation of the doubling rule is used intermittently then the scalar multiplication for the correct curve will fail for the attacking curve because these two curves have different b coefficients. In a typical example, for a curve over a field $F_p$, where p is a prime close to $2^{192}$ (such as P-192), the scalar multiplication requires about 192 point doubling. If ten of these doublings use the alternate doubling rule then the cost is ten more field multiplications, which is a very small relative increase, since scalar multiplication in these takes over the equivalent of one thousand field multiplications.

Binary Curve Implementation: The usual affine curve equation is $y^2+xy=x^3+ax^2+b$. The usual formula for doubling a point is $$2(x,y)=(x',y')$$

where $$x'=z^2+z+a,$$

$$y'=x^2+(z+1)x',$$

and $$x'=x+y/x.$$

The curve equation gives us that $$a=y^2/x^2+y/x-x-b$$

hence $$z=f_b(x,y)$$

is a polynomial in b. Using this value of x' intermittently in the doubling formula produces the correct result in the correct curve but a different result in an attacking curve with a different coefficient.

The inventors have also recognized that the prime power factorization of a private key may be exploited in an attack. If the private key v is divisible by a small prime p, then vP will be equal to the point at infinity of a curve of order p.

By selecting curves of small prime order, the divisibility of the private key by such small primes may be detected. The attacker sends a point on a curve of one such prime order. If the private key is divisible by the prime order, then the product computed by the victim is equal to the point of infinity. Such a point at infinity may be detected by the attacker, and therefore used to determine information about the prime power factorization of the private key.

The inventors have recognized that such an attack may be prevented by choosing a private key that is prime or that has no small prime factors. The inventors have therefore implemented a method of generating a private key by generating a random number and checking the random number for divisibility by small primes. Alternatively any known method of generating a prime is used.

Although the invention has been described with reference to certain specific embodiments, various modifications thereof will be apparent to those skilled in the art without departing from the spirit and scope of the invention as outlined in the claims appended hereto.

The invention claimed is:

1. A computer implemented method of generating a private key to be used in a cryptographic operation, the cryptographic operation utilizing a particular elliptic curve and being performed in a cryptographic module in a cryptographic system, the method comprising:
   the cryptographic module generating a private key by:
      generating a prime number and using the prime number as the private key; or
      generating a random number and checking the random number for divisibility by small primes, and if the random number is not divisible by small primes, using the random number as the private key; and,
   the cryptographic module providing the private key to be used in at least one step in the cryptographic operation that utilizes a combination of the private key and a point on the particular elliptic curve.

2. The method according to claim 1, wherein the point on the particular elliptic curve represents a public key.

3. The method according to claim 1, wherein the at least one step in the cryptographic operation comprises using information that uniquely identifies the particular elliptic curve.

4. The method according to claim 3, wherein the information that uniquely identifies the particular elliptic curve comprises a pair of values.

5. The method according to claim 4, wherein the pair of values correspond to a pair of coefficients a, b for an equation defining the particular elliptic curve.

6. The method according to claim 5, wherein the at least one step in the cryptographic operation uses the coefficient b in at least one but not all doubling operations performed in combining the private key and the point.

7. The method according to claim 1, wherein the cryptographic operation comprises recovering a message from a cryptographically encoded message, the message being encoded by the shared secret.

8. The method according to claim 7, wherein the encoded message utilizes one or more of encryption and authentication.

9. A non-transitory computer readable medium comprising computer executable instructions executed on a computer for generating a shared secret in a cryptographic operation utilizing a particular elliptic curve and being performed in a cryptographic module in a cryptographic system, the computer executable instructions comprising instructions for:
   the cryptographic module generating a private key by:
      generating a prime number and using the prime number as the private key; or
      generating a random number and checking the random number for divisibility by small primes, and if the random number is not divisible by small primes, using the random number as the private key; and
   the cryptographic module providing the private key to be used in at least one step in the cryptographic operation that utilizes a combination of the private key and a point on the particular elliptic curve.

10. The non-transitory computer readable medium according to claim 9, wherein the point on the particular elliptic curve represents a public key.

11. The non-transitory computer readable medium according to claim 9, wherein the at least one step in the cryptographic operation comprises using information that uniquely identifies the particular elliptic curve.

12. The non-transitory computer readable medium according to claim 11, wherein the information that uniquely identifies the particular elliptic curve comprises a pair of values.

13. The non-transitory computer readable medium according to claim 12, wherein the pair of values correspond to a pair of coefficients a, b for an equation defining the particular elliptic curve.

14. The non-transitory computer readable medium according to claim 13, wherein the at least one step in the cryptographic operation uses the coefficient b in at least one but not all doubling operations performed in combining the private key and the point.

15. The non-transitory computer readable medium according to claim 9, wherein the cryptographic operation comprises recovering a message from a cryptographically encoded message, the message being encoded by the shared secret.

16. The non-transitory computer readable medium according to claim 15, wherein the encoded message utilizes one or more of encryption and authentication.

17. A cryptographic module on a computer in a cryptographic system comprising computer executable instructions that when executed by the cryptographic module perform the acts of:
  generating a private key by:
    generating a prime number and using the prime number as the private key; or
    generating a random number and checking the random number for divisibility by small primes, and if the random number is not divisible by small primes, using the random, number as the private key; and
  providing the private key to be used in at least one step in the cryptographic operation that utilizes a combination of the private key and a point on the particular elliptic curve.

18. The cryptographic module according to claim 17, wherein the point on the particular elliptic curve represents a public key.

19. The cryptographic module according to claim 17, wherein the at least one step in the cryptographic operation comprises using information that uniquely identifies the particular elliptic curve.

20. The cryptographic module according to claim 19, wherein the information that uniquely identifies the particular elliptic curve comprises a pair of values.

21. The cryptographic module according to claim 20, wherein the pair of values correspond to a pair of coefficients a, b for an equation defining the particular elliptic curve.

22. The cryptographic module according to claim 21, wherein the at least one step in the cryptographic operation uses the coefficient b in at least one but not all doubling operations performed in combining the private key and the point.

23. The cryptographic module according to claim 17, wherein the cryptographic operation comprises recovering a message from a cryptographically encoded message, the message being encoded by the shared secret.

24. The cryptographic module according to claim 23, wherein the encoded message utilizes one or more of encryption and authentication.

* * * * *